Jan. 21, 1936. H. L. VAN VALKENBURG 2,028,259
AUTOMATIC CONTROL SYSTEM FOR ELECTRIC MOTORS
Filed Jan. 11, 1934 3 Sheets-Sheet 1

INVENTOR
Hermon L. Van Valkenburg
BY
Arthur R. Woolfork
ATTORNEY

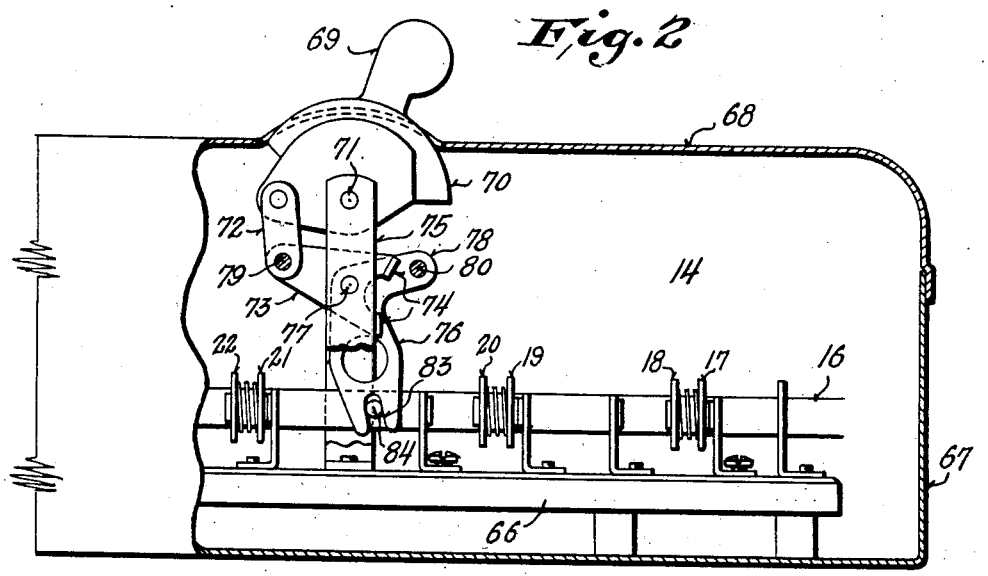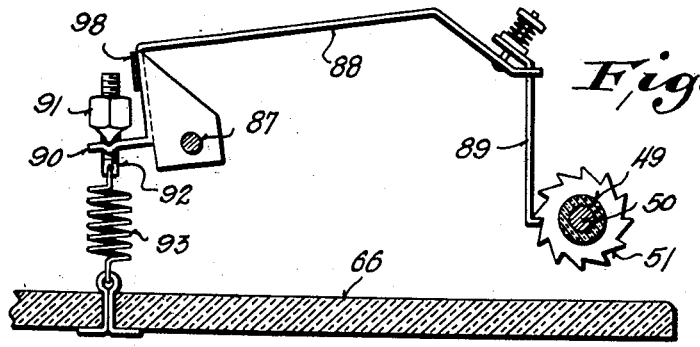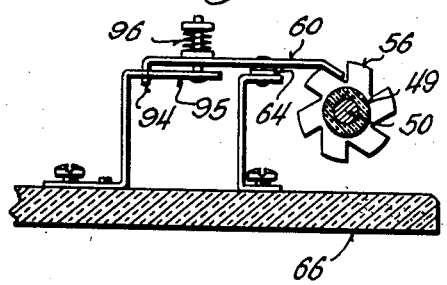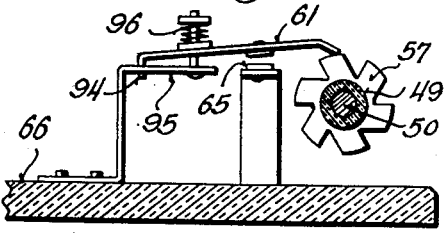

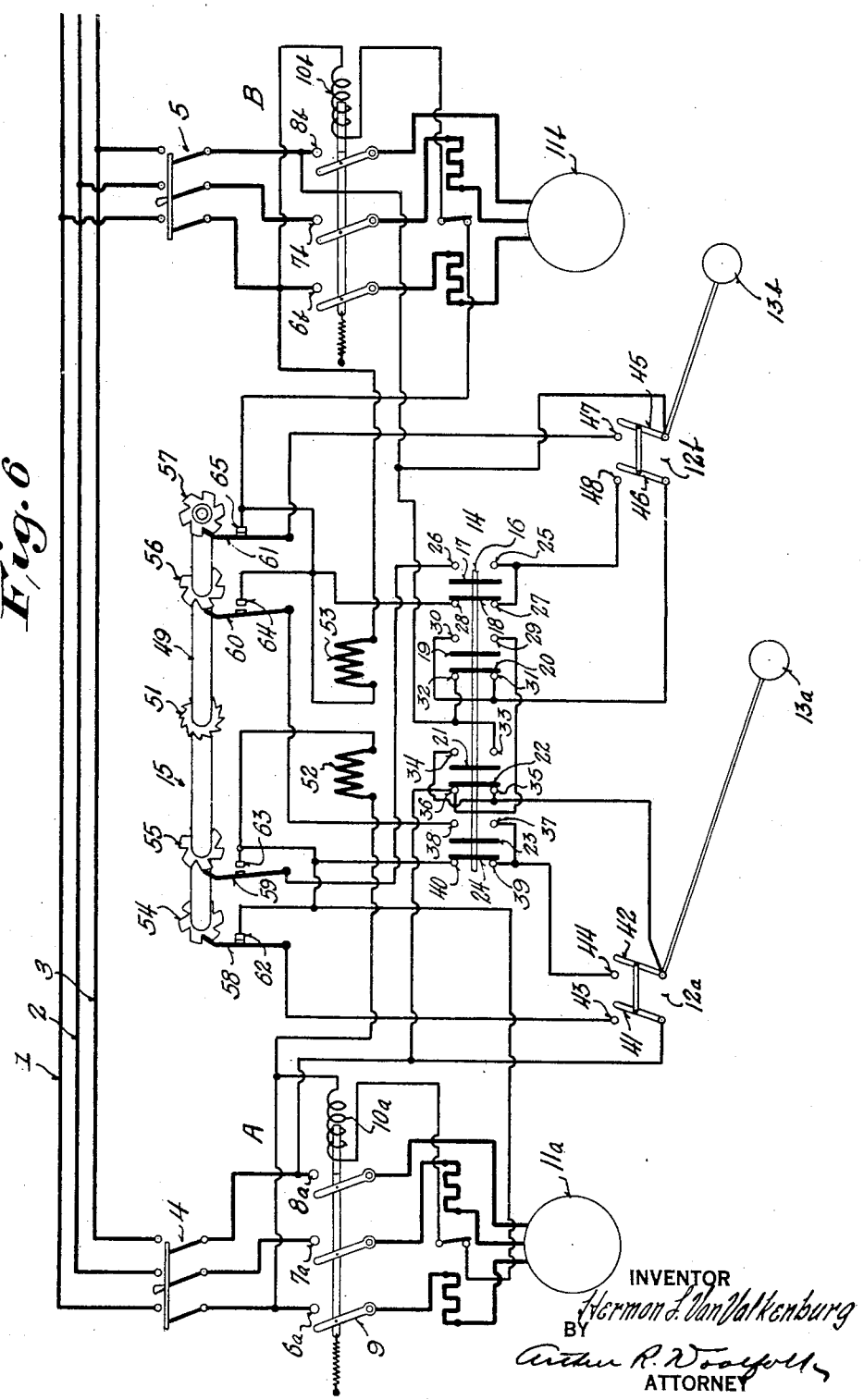

Patented Jan. 21, 1936

2,028,259

UNITED STATES PATENT OFFICE 2,028,259

AUTOMATIC CONTROL SYSTEM FOR ELECTRIC MOTORS

Hermon L. Van Valkenburg, Wauwatosa, Wis., assignor to Square D Company, Detroit, Mich.

Application January 11, 1934, Serial No. 706,165

10 Claims. (Cl. 172—239)

This invention relates to an automatic control system for electric motors.

In numerous installations it is frequently desirable to have two motors each directly connected to a pump, for instance, and adapted to pump water out of a receptacle or to maintain a certain predetermined pressure and to control these motors by fluid condition responsive means, such, for instance, as float switches or pressure switches, the switches being so positioned or set that they respond to different water levels or to different pressures, as the case may be.

Objects of this invention are to provide a system in which automatic means are employed to cause the alternate operation of the motors from the first fluid condition responsive means while at the same time permitting the then second motor to come into operation when the first motor is unable to carry the load, so that if the water should rise, or if the pressure should rise beyond the capacity of the first motor, that nevertheless the then second motor comes into operation as a safety device to augment the action of the first motor.

Further objects are to provide a construction in which either float switch or pressure switch may be adjusted to either operating level and will cooperate with the other portions of the system to operate starters for the two motors in an alternate manner and to provide means whereby the other switch or second switch will always start the stand by motor, if the latter is needed.

Further objects are to provide a system in which automatic starters are employed for the motors, in which the automatic starters are not interconnected in any way, and in which the fewest possible number of control wires are used.

Further objects are to provide a transfer switch which may be manually operable externally of its casing to cut out the alternator switch and to transfer each float switch or pressure switch to its respective starter, and which is so constructed that it cannot be left in neutral, and if inadvertently left in its second position, that is to say, where it cuts out the automatic alternator switch, no harm will be done, as the safety feature of the stand by motor or additional motor is retained even in this position of the transfer switch.

Further objects are to provide a control system in which two motors are employed each equipped with an automatic starter and a line switch, in which the transfer switch is so connected that when it is thrown to its second position, either line switch may be opened, thereby cutting out all electrical connection between the motor, its starter or its float or pressure switch, and the line, so that the entire system for this motor is completely disconnected from the line and repairs may be made, the other motor responding to its float or pressure switch independently of the first motor.

Further objects are to provide a construction in which either float switch or pressure switch can be set at the high level without changing any portion of the wiring or of the system whatsoever, in which the transfer switch may be very simply constructed and may be associated with the alternator switch in a very compact manner, the alternator switch itself being provided with a pair of electromagnets connected with its respective starter and so mechanically connected with a four-pole alternator switch that either or both electromagnets will operate such alternator switch when either or both motors stop functioning, neither magnet being capable of operating the alternator switch when either motor is in operation.

An embodiment of the invention is shown in the accompanying drawings, in which:

Figure 2 is a fragmentary elevation, with parts broken away and in section, showing the operating mechanism for the transfer switch.

Figure 3 is a fragmentary detail corresponding to a section on the line 3—3 of Figure 1.

Figure 4 is a fragmentary detail corresponding to a section on the line 4—4 of Figure 1.

Figure 5 is a fragmentary sectional view corresponding to a section on the line 5—5 of Figure 1.

Figure 6 is a diagrammatic view showing the wiring for the entire system.

Figure 1:
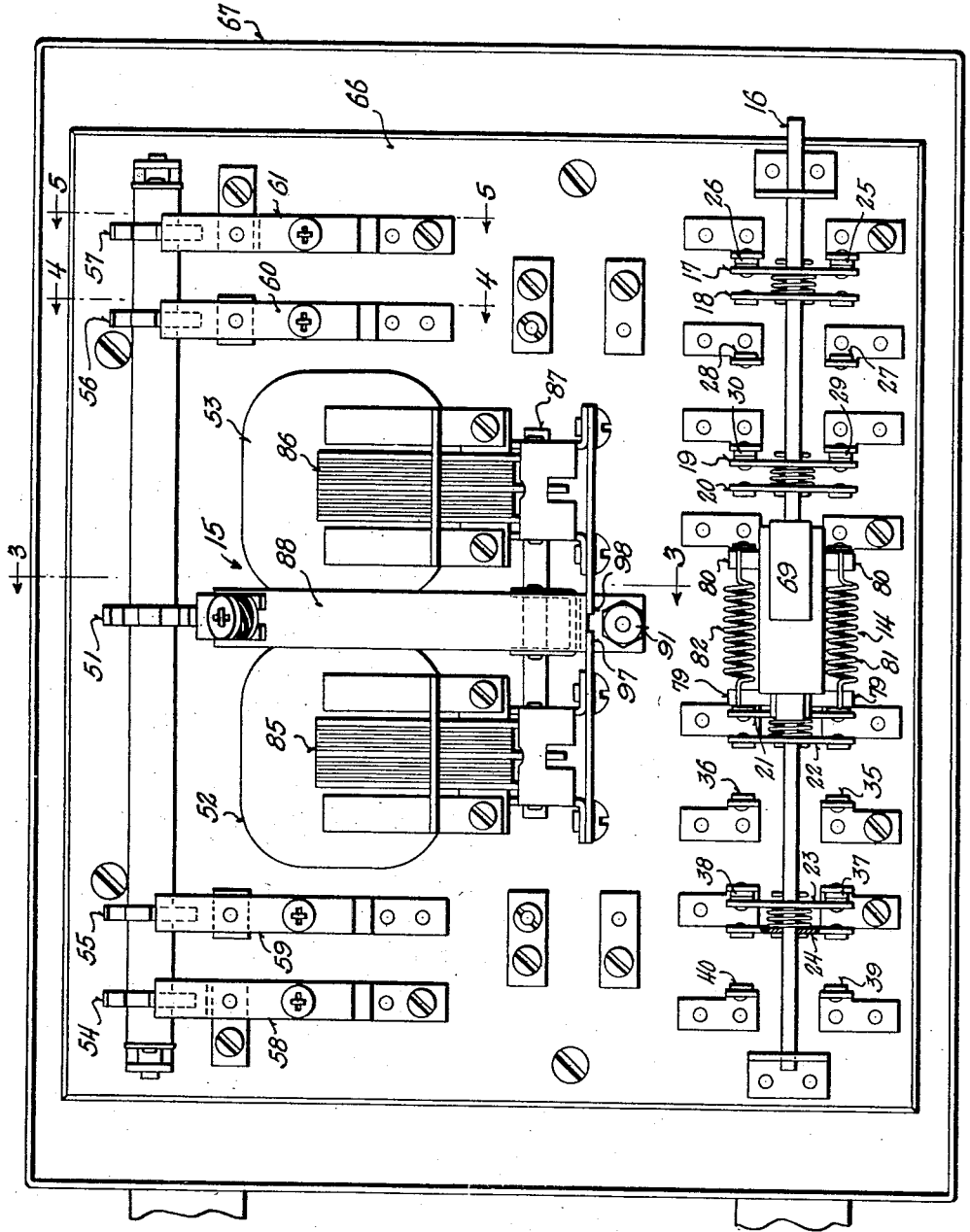
Figure 1 is a plan view of the alternator and transfer switch with the cover for the casing removed.

A description of the circuits will be given first and attention is directed to Figure 6.

The mains are indicated by the reference characters 1, 2 and 3, and are connected to the separate starters indicated generally at A and B by means of line switches 4 and 5 respectively. The mains are connected to the three contacts of the starters indicated at $6_a$, $7_a$ and $8_a$, $6_b$, $7_b$ and $8_b$ respectively. These starters are provided with movable contacts indicated generally at 9, which are simultaneously moved by means of the control or operating coils $10_a$ and $10_b$ respectively. The motors which are directly connected to the pumps (the latter not shown) are indicated by the reference characters 11a and 11b. If desired, thermal overload means diagrammatically shown at the respective starters may be provided, although this feature forms no part of the invention. Fluid condition responsive means either in the form of pressure switches or of float switches are provided and are set to operate at different points in the height or level of a rising liquid or different pressures. In the form shown in Figure 6, float switches have been diagrammatically indicated by the reference characters 12a and 12b, the floats 13a and 13b being set at different levels.

It is to be noted particularly that either float may be set at the higher level. The transfer switch is indicated generally by the reference character 14, and the alternator switch by the reference character 15. The transfer switch may comprise an elongated bar 16 of insulating material which carries the movable contacts 17, 18, 19, 20, 21, 22, 23 and 24. These contacts respectively cooperate with the pairs of stationary contacts 25 and 26, 27 and 28, 29 and 30, 31 and 32, 33 and 34, 35 and 36, 37 and 38, 39 and 40.

The float switches are each double pole switches. The float switch 12a is provided with movable contacts 41 and 42 cooperating respectively with the stationary contacts 43 and 44, and the float switch 12b is provided with movable contacts 45 and 46 cooperating respectively with the stationary contacts 47 and 48.

The automatic alternator 15 is provided with a shaft indicated generally by the reference character 49. This shaft, as a matter of fact, may be made of a central rod 50, see Figure 3, and insulating spacers. At all events, the shaft carries a ratchet wheel 51 operated from electromagnets, indicated diagrammatically at 52 and 53 in Figure 6, in such a manner, as will hereinafter appear when the mechanical construction is given, that either or both electromagnets will rotate the shaft one notch on the deenergization of the magnet.

The shaft also carries four insulating notched cam wheels 54, 55, 56 and 57. Each cam wheel or notched wheel has a small lever cooperating therewith indicated by the reference characters 58, 59, 60 and 61 respectively. Each of these small levers or cam followers constitutes a movable contact which is respectively adapted to cooperate with the stationary contacts 62, 63, 64 and 65, it being noted that the stationary contacts are arranged in two groups, and that one member of each group is closed while the other member is opened.

In the position of the parts shown in Figure 6, the transfer switch is in its second position so that each float independently controls each corresponding motor, and although the alternator switch operates upon the deenergization of either or both of the electromagnets 52 and 53, it does not affect the control of the motors.

However, assuming that the line switches 4 and 5 are closed, it will be seen that when the first float 13a rises, that the motor 11a will be started. The holding coil 10a is connected on one side to the main 1 and on its other side is connected to the stationary contact 62 and through the movable contact 58 to the stationary contact 43 of the float switch. Therefore, when the float switch closes, the stationary contact 43 is connected by means of the movable contact 41 to the line wire 3. The control coil or holding coil 10a is, therefore, energized and the contactor A closes, thus putting the motor 11a into service.

Also it will be noted that the movable contact 42 engages the stationary contact 44 and closes a circuit through the alternator magnet 52 as follows: From the main line 1 through such magnet 52 to contact 40 of the transfer switch through the movable contact 24 to contact 39 of the alternator switch and to stationary contact 44 of the float switch 12a. This movable contact 42 is connected to the stationary contact 35 and by means of movable contact 22 to the stationary contact 36. From this point it is connected to the main 3 and thus the magnet 52 is energized. If during this condition the float switch 12b closes, it will start the motor 11b in exactly the same manner as described for the motor 11a.

As a matter of fact, to simplify the description it is to be noted that the magnet 52 is in parallel with the coil 10a and the magnet 53 in parallel with the coil 10b so that when either starter A or B is operated, its corresponding magnet 52 or 53 is energized.

When the float switches open, the magnets 52 and 53 are deenergized and the alternator shaft is rotated one notch in a manner hereinafter to appear. However, this has no effect upon the operation of the motors when the transfer switch is in the position shown in Figure 6. In this position, which is hereinafter referred to as the second position of the transfer switch, each float independently controls its corresponding motor and there is no alternation of operation. In addition to this, the transfer switch in this second position does not electrically transfer the connections from one side of the system to the other, but each starter and each float switch is independent of other portions of the apparatus and therefore when the corresponding line switch 4 or 5 is open, the corresponding motor, starter or float switch may be inspected or repaired with impunity, as it is not connected with any live portion of the system. Service, however, is not interrupted, as the other motor will operate whenever its float switch or fluid condition responsive switch calls for its operation.

Assume now that the transfer switch 14 is thrown to its first position, that is to say, to the right as viewed in Figure 6. The contacts heretofore connected, namely, 39 and 40, 35 and 36, 31 and 32, 27 and 28 are disconnected and the contacts 37 and 38, 33 and 34, 29 and 30, 25 and 26 are connected. Under these conditions the alternator is effective in causing the alternate operation of the motors.

For example, assume that the fluid condition responsive switch 12a closes with the alternator switch 15 in the position shown. Under these conditions, the control coil 10a for the starter A and the magnet 52 are each energized, as each has one side connected to the line 1 and the other side connected through stationary contact 62, movable contact 58 of the alternator to the stationary contact 43 of the fluid condition responsive means. The movable contact 41 of such last mentioned switch then connects the stationary contact 43 with the main 3 and consequently the magnet 52 and the control coil 10a are energized. Subsequently if the switch 12b closes, the control coil 10b of the starter B and the alternator magnet 53 will be energized, as one side of each is connected to the main 1 and the other side connected through the stationary contact 65 and movable contact 61 of the alternator switch to the stationary contact 47 of the float switch or fluid condition responsive switch 12b. The movable contact 45 of such switch 12b connects the stationary contact 47 with the line 3.

Assume now that the transfer switch is still in its first position as just described, but that the alternator switch has turned one notch. Under these conditions the movable contact 58 is removed from the stationary contact 62 and similarly the movable contact 61 is removed from its stationary contact 65. The movable contact 59 engages the stationary contact 63 and the movable contact 60 engages the stationary contact 64. Now if the float switch 12a closes, an electrical circuit is established which causes the energization of the operating coil 10b for the starter B and the electromagnet 53. Thus the motor 11b is started. Subsequently, closing of the switch 12b will start the motor 11a.

If it is desired to trace out this circuit, it is obvious that the main 1 is connected through the control coil 10b and the magnet coil 53 to the stationary contact 64 and the movable contact 60 of the alternator. From this point the circuit extends to the stationary contact 38 of the transfer switch, to the stationary contact 37 and from this point to the stationary contact 44 of the float switch 12b. The movable contact engages the stationary contact 44 and the circuit from this point extends to the stationary contact 34 of the alternator switch, through the stationary contact 33 back to the main 3.

Subsequent operation of the higher float switch 12b will cause the operation of the motor 11a in the same manner as described immediately hereinabove.

Referring to the mechanical construction, it is clear from Figures 1 to 5 that the alternator and transfer switch are each carried on a panel 66 of insulating material mounted within a casing 67. This casing may be provided with a hinged top 68 provided with a slot through which the manipulating or operating handle 69 for the transfer switch projects, so that the transfer switch is operable exteriorly of the casing. In Figures 1 and 2 it is to be noted that the transfer switch is shown in what has heretofore been described as its first position, thus permitting the alternate operation of the motors.

Referring to Figures 1 and 2, it will be seen that the operating handle 69 is provided with a segmental hub 70 and is pivoted, as indicated at 71. It is connected by means of a link 72 with a rock lever 73, such rock lever being provided with feet 74 which alternately engage one of the vertical supports 75 of the frame that pivotally supports the manipulating lever 69, as shown most clearly in Figure 2. This limits the stroke or throw of the operating lever for the transfer switch.

These frame members 75 also carry a bell crank lever 76 which is pivoted, as indicated at 77, and is provided with a short arm 78. The pin 79 joining the link 72 and lever 73 and a pin 80 carried by the short arm 78 of the bell crank lever, are extended laterally, as shown in Figure 1, and are joined by means of a pair of tension springs 81 and 82. This mechanism constitutes a quick motion mechanism, for it is apparent that as the pin 79 is rocked downwardly from the position shown in Figure 2, it passes dead center and thus the springs 81 and 82, see Figure 1, will cause the bell crank lever 76 to suddenly snap to its other extreme position. Similarly, when the operating handle is rocked back to the position shown in Figure 2, a snap action occurs.

The bell crank lever 76 is provided with a slot 83 in its lower end which receives a pin 84 carried by the elongated insulating bar 15 of the transfer switch. Thus the transfer switch is moved from one to the other of its two positions with a quick motion or snap action and in such a manner that it cannot stop in a neutral position.

Referring particularly to Figures 1, 3, 4, and 5, it will be seen that the magnets 52 and 53 are respectively provided with pivoted armatures 85 and 86. These armatures are pivoted upon the pivot pin 87, see Figure 1, which also pivotally supports the lever 88, see Figures 1 and 3. This lever 88 is provided with a pawl 89 spring urged into engagement with the ratchet wheel 51 hereinbefore described. Also the lever 88 is provided with a rearwardly projecting tongue 90 within which an adjustable nut 91 seats, such nut being threaded upon a pin 92 connected to the tension spring 93. The tension spring returns the lever 88 to its normal position, as shown in Figure 3, when both magnets are deenergized and thus rocks the ratchet wheel one notch, correspondingly changing the connection of the alternator switch as hereinbefore described.

The movable contacts 58, 59, 60, and 61 of the alternator switch are shown in plan view in Figure 1. Certain of these movable contacts are shown in elevation in Figures 4 and 5. In Figure 4 the movable contact 60 rests in a notch in its cam or star wheel 56 and in engagement with its corresponding stationary contact 64. In Figure 5 the movable contact 61 is shown raised by its cam or notched wheel 57 and out of engagement with the corresponding stationary contact 65. In each case these movable contacts may be provided with a small projecting tongue 94, leaving a shouldered portion resting upon a support 95. Each movable contact is pressed inwardly by means of a spring 96.

It will be seen also from Figure 1 that the rear portion of the armatures 85 and 86 are provided with projecting tongues 97 and 98 which overlap a portion of the lever 88. This is also shown in Figure 3. It is apparent, therefore, that when the magnet is energized and its armature drawn downwardly, that the lever 88 is moved inwardly, and the pawl 89 consequently engages the next notch of the ratchet wheel 51, see Figure 3. Obviously if both magnets are energized, the same result is produced. When neither magnet is energized, the spring 93 returns the lever 88, see Figure 3, to its normal position, thus rotating the ratchet wheel 51 one notch and correspondingly changing the position of the alternator switch contacts.

It will be seen that an automatic system has been provided whereby two electric motors (preferably directly connected to pumps, not shown) are each alternately controlled under normal operation by the lower float switch or the corresponding pressure switch, the other motor being thrown into operation when the second float switch or pressure switch closes in the event this additional motor is required.

It will be seen further that the alternation of the motors is wholly automatic and that the circuits for the alternating action of the motors are established after the motors cease operating. Also it is to be noted particularly that in the event repair or inspection of one or the other of the motors, or of their corresponding starters or float switches, is desired, the transfer switch may be thrown to its second position, thus connecting each motor with its corresponding float switch independently of the other motor or of the other float switch. Obviously, therefore, when the line switch corresponding to one of the motors is opened, all circuits relating to this motor, and including such motor, its starter and its float switch, are dead and the operator may safely work upon such portion of the system. There is no electrical interconnection between the two sides of the system at this time.

In the event that the transfer switch is inadvertently left in its second position calling for the independent operation of the motors by their respective float switches, it is clear that no danger is encountered as the safety feature, namely, the operation of the stand by or auxiliary motor upon excessive load, is still obtained in an automatic manner. The only thing that is not obtained during this condition is the alternate operation of each of the motors from the lower float switch or pressure switch, and from the upper float switch or pressure switch.

It will be seen further that this change-over is very readily accomplished by the manipulation of a single control lever for the transfer switch.

It will be seen further that the system is very simple, is easy to install and has a very small number of control circuits.

Although this invention has been described in considerable detail, it is to be understood that such description is intended as illustrative rather than limiting, as the invention may be variously embodied and is to be interpreted as claimed.

I claim:

1. In a control system, a pair of electric motors, a source of power for said motors, a pair of fluid condition responsive means respectively controlling said motors, an alternator switch for alternating the respective control of said motors with respect to said fluid condition responsive means, and a transfer switch for stopping the alternation of control, said transfer switch allowing the free mechanical operation of said alternator switch but preventing said alternator switch from altering the control for said motors, said transfer switch transferring the control of one motor to one of said fluid condition responsive means, and the control of the other of said motors to the other of said fluid condition responsive means irrespective of the position of said alternator switch, whereby when the transfer switch stops the alternation of control, a given motor is always controlled by a given fluid condition responsive means.

2. In a control system, a pair of electric motors, a source of power for said motors, a pair of fluid condition responsive means respectively controlling said motors, an alternator switch for alternating the respective control of said motors with respect to said fluid condition responsive means, and a transfer switch for stopping the alternation of control, said transfer switch allowing the free mechanical operation of said alternator switch but preventing said alternator switch from altering the control for said motors, said transfer switch transferring the control of one motor to one of said fluid condition responsive means, and the control of the other of said motors to the other of said fluid condition responsive means irrespective of the position of said alternator switch, whereby when the transfer switch stops the alternation of control, a given motor is always controlled by a given fluid condition responsive means, said alternator switch being automatic and altering the control of said motors only when both of said motors are inactive.

3. In a control system, a pair of electric motors, a source of power, automatic starters for said motors, a first and a second fluid condition responsive means respectively controlling said starters, an automatic alternator switch alternately transferring the control of one of said starters to one of said fluid condition responsive means and the control of the other of said starters to the other of said fluid condition responsive means, and a transfer switch for stopping the alternation of control of said starters and for placing one of said starters under the control of one of said fluid condition responsive means and the other of said starters under the control of the other of said fluid condition responsive means, the operation of said transfer switch taking the control permanently away from the alternator switch, whereby the selective control of a motor is independent of any position that may subsequently be assumed by the alternator switch after operation of the transfer switch.

4. In a control system, a pair of electric motors, a source of power, automatic starters for said motors, a first and a second fluid condition responsive means respectively controlling said starters, an automatic alternator switch alternately transferring the control of one of said starters to one of said fluid condition responsive means and the control of the other of said starters to the other of said fluid condition responsive means, and a transfer switch for stopping the alternation of control of said starters and for placing one of said starters under the control of one of said fluid condition responsive means and the other of said starters under the control of the other of said fluid condition responsive means, said transfer switch being manually operable, the operation of said transfer switch taking the control permanently away from the alternator switch, whereby the selective control of a motor is independent of any position that may subsequently be assumed by the alternator switch after operation of the transfer switch.

5. In a control system, a pair of electric motors, a source of power, automatic starters for said motors, a first and a second fluid condition responsive means respectively controlling said starters, an automatic alternator switch alternately transferring the control of one of said starters to one of said fluid condition responsive means and the control of the other of said starters to the other of said fluid condition responsive means, and a transfer switch for stopping the alternation of control of said starters and for placing one of said starters under the control of one of said fluid condition responsive means and the other of said starters under the control of the other of said fluid condition responsive means, said transfer switch including mechanism for preventing said transfer switch from stopping in neutral position, the operation of said transfer switch taking the control permanently away from the alternator switch, whereby the selective control of a motor is independent of any position that may subsequently be assumed by the alternator switch after operation of the transfer switch.

6. In a control system, a pair of electric motors, a source of power, automatic starters for said motors, a first and a second fluid condition responsive means respectively controlling said starters, an automatic alternator switch alternately transferring the control of one of said starters to one of said fluid condition responsive means and the control of the other of said starters to the other of said fluid condition responsive means, a transfer switch for stopping the alternation of control of said starters and for placing one of said starters under the control of one of said fluid condition responsive means and the other of said starters under the control of the other of said fluid condition responsive means, the operation of said transfer switch taking the control permanently away from the alternator switch, whereby the selective control of a motor is independent of any position that may subsequently be assumed by the alternator switch after operation of the transfer switch, and a casing enclosing said transfer switch and said alternator switch, said transfer switch having manually operable means accessible exteriorly of said casing.

7. In a control system, a pair of electric motors, a source of power, automatic starters for said motors, a first and a second fluid condition responsive means respectively controlling said starters, an automatic alternator switch alternately transferring the control of one of said starters to one of said fluid condition responsive means and the control of the other of said starters to the other of said fluid condition responsive means, a transfer switch for stopping the alternation of control of said starters and for placing one of said starters under the control of one of said fluid condition responsive means and the other of said starters under the control of the other of said fluid condition responsive means, and a casing enclosing said transfer switch and said alternator switch, said transfer switch including quick motion mechanism for insuring its complete travel from one extreme position to the other and having manually operable means accessible exteriorly of said casing.

8. In a control system, a pair of electric motors, two fluid condition responsive means for controlling said motors, one of said means responding first and the other of said means responding subsequently when the fluid condition exceeds the setting of the first means, an automatic alternator switch for alternately placing the control of one motor with one fluid responsive means and the control of the other motor with the other fluid responsive means, and a transfer switch for stopping the alternation of control of said motors, said transfer switch allowing the free mechanical operation of said alternator switch but preventing said alternator switch from altering the control for said motors, said transfer switch placing the control of one motor with one fluid responsive means and the control of the other motor with the other fluid responsive means, irrespective of the position of said alternator switch, whereby when the transfer switch stops the alternation of control, a given motor is always controlled by a given fluid condition responsive means, one motor, under both conditions of operation coming into action as a reserve motor whenever the then active motor cannot handle the load.

9. The combination of a pair of motors, a first fluid responsive means and a second fluid responsive means for controlling said motors, said first means responding first and said second means responding secondly, a source of power, a line switch for each motor, an automatic alternator switch for alternatively connecting one motor with said first means and the other motor with said second means, and a transfer switch having a first position allowing the alternation of control of said motors and having a second position stopping the alternation of control of said motors, said transfer switch when in second position allowing the free mechanical operation of said alternator switch but preventing said alternator switch from altering the control for said motors, said transfer switch when in second position placing the control of one motor permanently with said first means and the control of the other motor permanently with said second means irrespective of the position of said alternator switch.

10. The combination of a pair of motors, a first fluid responsive means and a second fluid responsive means for controlling said motors, said first means responding first and said second means responding secondly, a source of power, a line switch for each motor, an automatic alternator switch for alternately connecting one motor with said first means and the other motor with said second means, and a transfer switch having a first position allowing the alternation of control of said motors and having a second position stopping the alternation of control of said motors, said transfer switch when in second position allowing the free mechanical operation of said alternator switch but preventing said alternator switch from altering the control for said motors, said transfer switch when in second position placing the control of one motor permanently with said first means and the control of the other motor permanently with said second means, the opening of a line switch cutting off the power from the corresponding motor and its control means when said transfer switch is in said second position.

HERMON L. VAN VALKENBURG.